Oct. 29, 1968
J. D. KENNELLY
3,408,624
EMERGENCY VEHICLE SIGNAL DEVICE
Filed Dec. 8, 1965
2 Sheets-Sheet 1
FIG. I
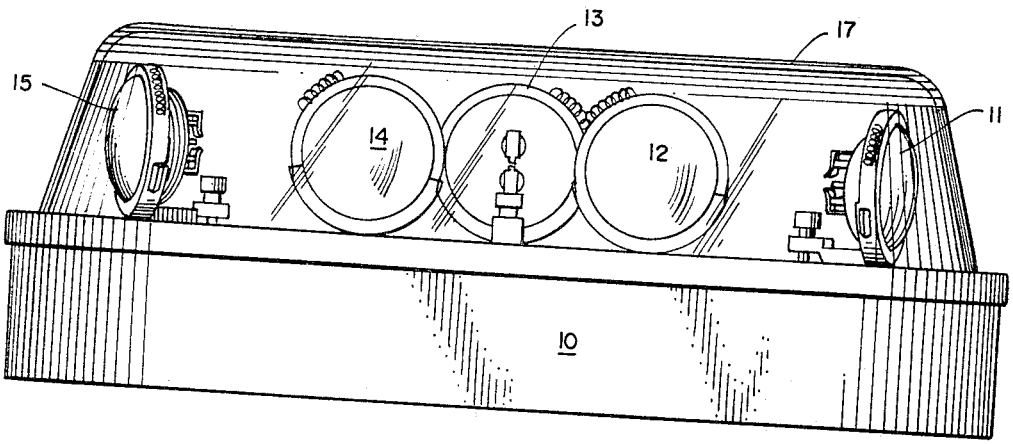
FIG. 2
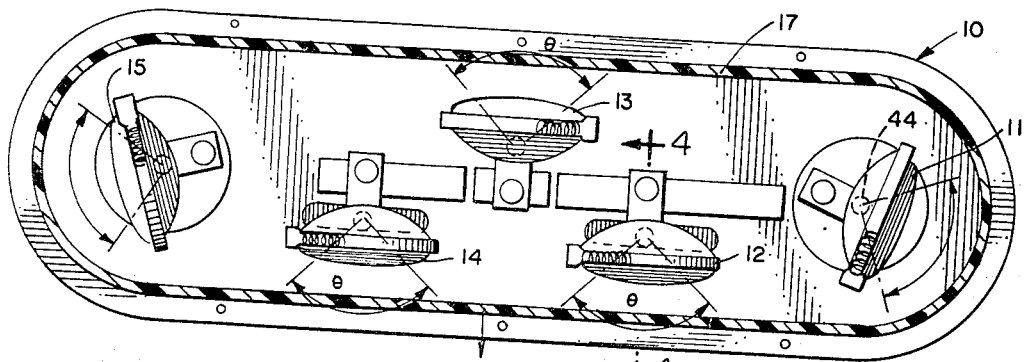
FIG. 3
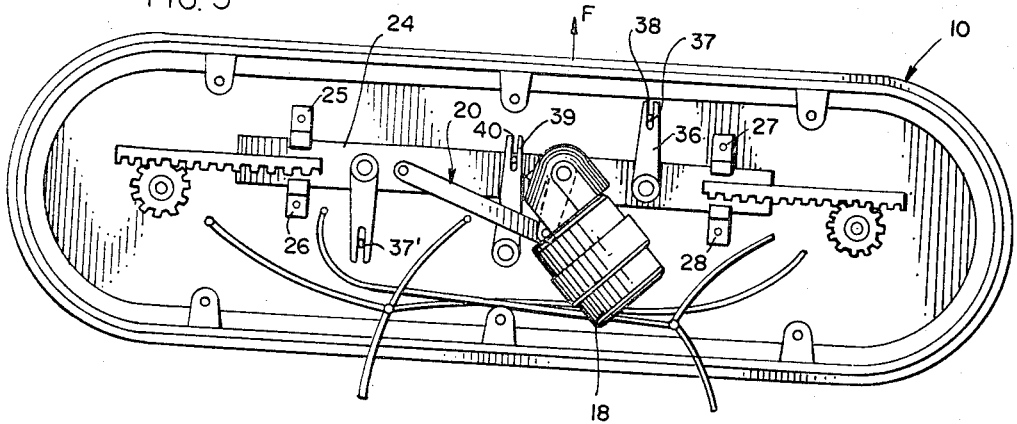
INVENTOR:
JEREMIAH D. KENNELLY
BY
Dawson, Tilton, Fallon, Lungmus & Alexander
ATT'YS Oct. 29, 1968

J. D. KENNELLY 3,408,624

EMERGENCY VEHICLE SIGNAL DEVICE

Filed Dec. 8, 1965

2 Sheets-Sheet 2

INVENTOR:
JEREMIAH D. KENNELLY
BY
Dawson, Tilton, Fallon, Lungmus & Alexander
ATT'YS

3,408,624
EMERGENCY VEHICLE SIGNAL DEVICE
Jeremiah D. Kennelly, 408 S. Oak Park Ave.,
Oak Park, Ill. 60302
Filed Dec. 8, 1965, Ser. No. 512,356
4 Claims. (Cl. 340—50)

This invention relates to a signal device and, more particularly, to a warning device in the nature of oscillating lights which are especially adapted for emergency vehicles. This application is related to my copending application, Ser. No. 395,386 filed Sept. 10, 1964, now Pat. No. 3,309,661.

An important object of the invention is to provide a novel warning device characterized by the fact that it presents a unique light pattern to the viewer. As such, the device has particular application to fire and other emergency vehicles which require distinctive patterns of warning so as to differentiate them from other vehicles equipped with emergency lights and the provision of a novel warning light constitutes an important object of the invention.

Other objects and advantages of the invention may be seen in the details of construction and operation of the invention. The invention is described in conjunction with an illustrated embodiment in the accompanying drawing, in which—

Figure 4:
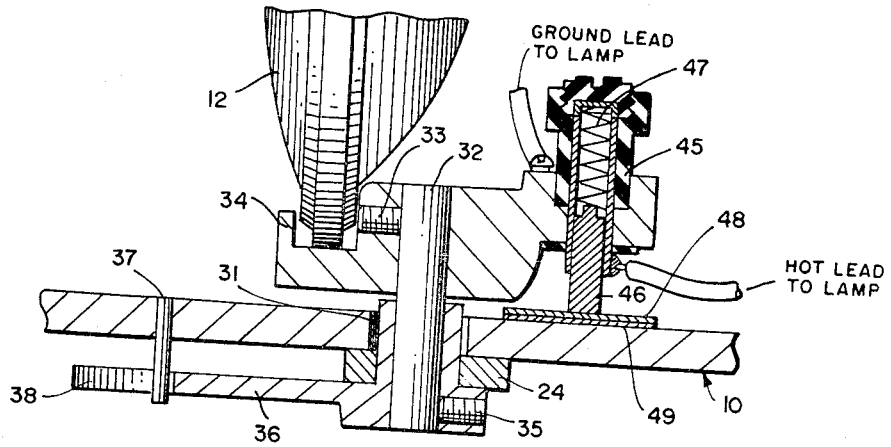
Figure 5:
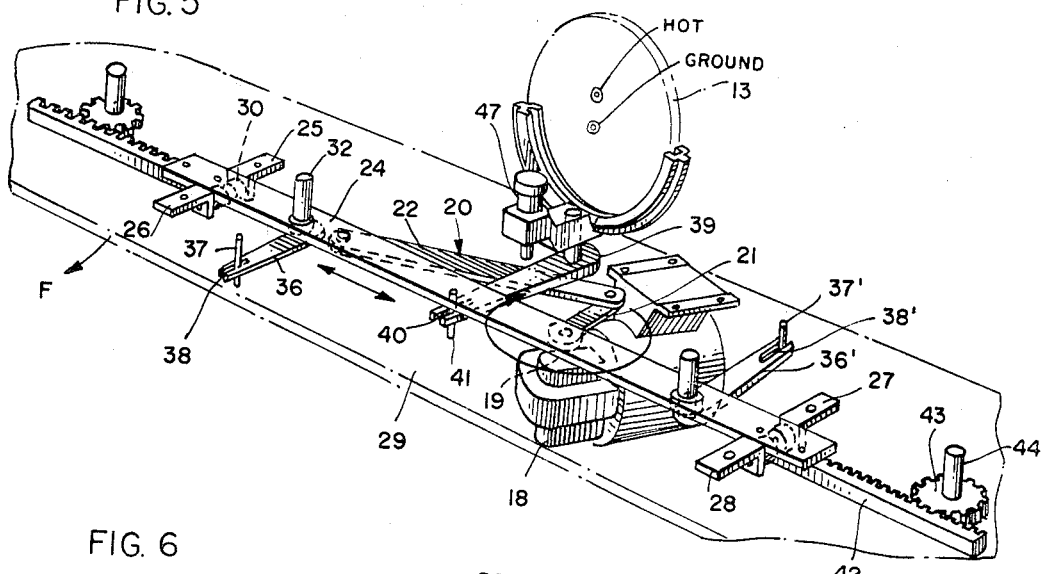
Figure 6:
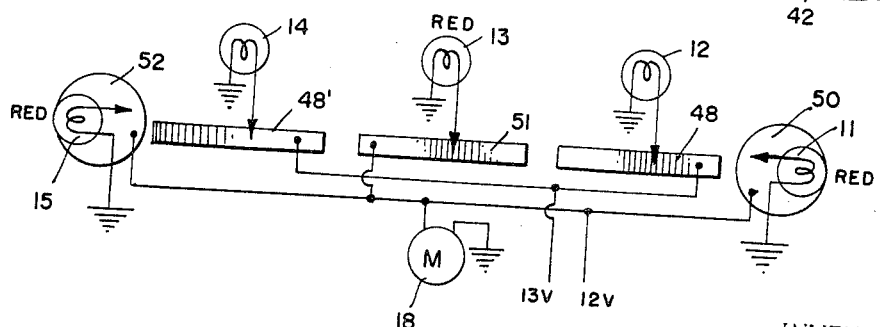

FIG. 1 is a front elevational view of the warning device constructed according to the teachings of the invention and which is adapted to be mounted atop the cab of an emergency vehicle; FIG. 2 is a top plan view of the device of FIG. 1 but with the superposed globe or glass in section; FIG. 3 is a bottom plan view; FIG. 4 is a fragmentary vertical sectional view, on enlarged scale, such as would be seen along the sight line 4—4 applied to FIG. 2; FIG. 5 is a top perspective view of a fragmentary portion of the apparatus and featuring the means for oscillating the various lamps; and FIG. 6 is a schematic wiring diagram for powering the lamps of FIG. 2.

In the illustration given and with particular reference to FIG. 1, the numeral 10 designates a housing which is adapted to be secured to an emergency vehicle and, as illustrated in FIG. 1, the viewer is viewing the front side of the signal device.

Mounted atop the housing 10, which is relatively elongated sidewise of the vehicle carrying the same, are five light sources 11, 12, 13, 14 and 15 in proceeding from the left to the right. The light sources 11 and 15 may be red flashers, so as to provide a distinctive contrast with the central sources 12–14, which may be beam-type lamps. The lamps 12 and 14 are essentially forwardly-facing (see FIGS. 2, 3 and 5 wherein the arrow designated F indicates the front of the vehicle), while the lamp 13 is essentially rearwardly-facing.

In FIG. 2, it will be noticed that the dotted line showings designated θ correspond to the extremes of movement or oscillation of the lamps 12–14 and that each lamp is arranged for pivotal movement over an arc of between about 70° and 90°. In the illustration given, the lamps are arranged for 80° of arcuate travel each, with the forwardly-facing lamps 12 and 14 arranged to have their beams overlap during 40° of mutual travel. All of the lamps 11–15 are confined within a transparent globe 17.

The lamps are all arranged to oscillate about vertical axes, with the arcs of movement for corresponding parts lying in the same horizontal plane.

The means for achieving the above described oscillatory operation can be appreciated from a consideration of FIGS. 3–5. In FIG. 3, the numeral 18 designates a motor which is suitably secured to the housing 10. The shaft extension 19 of the motor 18 is equipped with a bell crank generally designated 20 and which includes links 21 and 22 (see FIG. 5). The crank 20 is pivotally connected as at 23 to an elongated bar 24.

As seen in both FIGS. 3 and 5, the bar 24 is mounted for reciprocal movement between two sets of parallel ways 25, 26 and 27, 28. Thus, the crank-type linkage system 20 connecting the motor 18 with the bar 24 converts rotary motion to reciprocatory motion. The ways 25–28 may be advantageously secured to the underside of the platform portion 29 of the housing 10 which also provides direct support for the lamps 11, 13 and 15. In this connection, it is seen in FIG. 4 that the ways 25–28 are generally L-shaped for the receipt of the elongated bar 24 and are each equipped with rollers 30 to confine the bar 24 (see the lefthand portion of FIG. 5).

For the purpose of oscillating each of the lamps 12 and 14, the bar 24 is apertured as at 31 (now referring to FIG. 4) for the receipt of a vertical post 32. The post 31 is seen to be pinned as at 33 to the lamp base 34 and further pinned as at 35 to a fork 36. At the front portion of the lamp, the table 29 is apertured for the press-fit receipt of a fixed pivot post 37 which is received within the slot 38 of the fork 36 (see particularly FIG. 5).

In operation, as the bar 26 reciprocates, the post 32 is reciprocated accordingly. The front end of the fork 36 is fixed against movement parallel to the length of the bar 24 by the stationary pivot post 37, although the fork does move longitudinally of itself and relative to the pivot rod by virtue of the slot 38. This results in the lamp 12 (for example) moving over an arc the limits of which are defined by the dotted line showing in FIG. 3.

The lamp 14 is oscillated by means of a similar linkage except for the fact that the pivot post 37' is placed rearwardly of the driving bar 24 rather than forwardly (and the fork 36' with slot 38' disposed rearwardly), so that an essentially opposite oscillation is developed. The lamps 12 and 14 thus throw their beams in overlapping relation during a portion of each oscillation, this being shown in greater detail in my abovementioned copending application, and reference may be made thereto for an additional showing of this feature of the invention.

The rearwardly-facing lamp 13 is seen to be mounted on the platform 29, but with the fork 39 thereof having its slotted end 40 in engagement with a post 41 (see FIG. 5) fixed to the bar 24. The pivot post 41 is thus in a movable position relative to the table 29 as contrasted to the posts 37 and 37'.

The lamps 11 and 15 are oscillated by a rack and pinion arrangement 42 and 43. The lamp-carrying post 44 is received within the pinion 43 and is journalled in the table 29 while the racks 42 are bolted to the opposite ends of the bar 24.

Each lamp 11–15 may be advantageously powered by spring-loaded brushes of the type shown relative to the lamp 12 in FIG. 4. There, the lamp base 34 is seen to be equipped with an insulating holder 45 which provides the mounting for a brush 46 which is urged downwardly by a spring 47. The brush 46 rides on a bus bar 48 suitably insulated from the table by means of an insulating plate 49.

The electrical circuitry for powering the lamps 12 and 14 is seen in FIG. 6, wherein the bus bars 48 and 48' are arranged in parallel, for supply by 13 volt current, the return to ground being indicated schematically. The lamps 11, 13 and 15 have bus bars or plates 50, 51 and 52, respectively arranged for 12 volt current which also is delivered to the motor 18.

In the operation of the device, the lamps 12 and 14 oscillate to provide an interference pattern i.e., overlapped beams during about one-half of their oscillation. This develops an extremely brilliant beam clearly seen or more properly felt by both pedestrians and automobile drivers in the path of the emergency vehicle. The rearwardly-facing red lamp 13 calls attention to the existence of an emergency to those persons rearwardly of the vehicle carrying the housing 10. It will be appreciated that the housing 10 is normally in an elevated position— as atop the cab of a fire engine.

The end lamps 11 and 15 oscillate about center lines which are disposed essentially laterally of the vehicle. As can be appreciated from FIG. 2, the lamps 11 and 15 oscillate from a position about 70° forward of a true lateral direction to a position about 10° rearwardly of the true lateral distance. These said lamps are also red in the illustrated embodiment and serve to warn persons or automobiles approaching on the flanks or beams of the emergency vehicle that there is an emergency situation.

While in the foregoing specification a detailed description of an embodiment of the invention has been set down for the purpose of explanation thereof, many variations in the details herein given may be made by those skilled in the art without departing from the spirit and scope of the invention.

I claim:

1. A signal device for emergency vehicles comprising a housing equipped with a transposed globe, five warning lamps rotatably mounted within said housing for projecting beams thereof out of said globe, said five lamps being generally aligned with the end lamps being mounted for oscillation about a center line extending generally parallel to the aligned lamps, two of the remaining lamps being arranged to oscillate about center lines extending generally normal to the aligned lamps and means in said housing for oscillating all of said lamps and for specifically the last mentioned two lamps about their respective axes in arcs in a common plane, so that beams therefrom are in overlapping relation for a portion of each oscillation, said oscillating means including a plurality of linkage actuated from a common reciprocating bar mounted on said frame to provide each lamp with an oscillating arc of about 70 to about 90°.

2. The structure of claim 1 in which the first mentioned two lamps are equipped with posts journalled in said housing, a pinion gear on each shaft and a rack fixed to said reciprocating bar operatively associated with a given pinion gear for oscillating said first mentioned lamps, the remaining lamps being coupled to said reciprocating bar by post and fork means.

3. A signal device of the character described comprising a relatively elongated housing defining a generally flat platform adapted to be horizontally disposed, a transparent globe coupled to said housing and projecting about and confining said platform, five lamps rotatably mounted within said housing and projecting about said platform for directing the beams thereof out of said globe, said lamps being generally aligned along the length of said platform, the end lamps and center lamps of said five lamps being journalled in said platform and equipped with shafts through said platform, a motor mounted on the underside of said platform, an elongated bar having its length generally aligned with said aligned lamps, slidably mounted on the underside of said platform, a bell crank coupling said motor to said reciprocating bar, the remaining two lamps being equipped with depending shafts journalled in said reciprocating bar, a rack and pinion mechanism coupling each end of said bar to an adjacent end lamp, a post and fork arrangement coupling said center lamp shaft to said bar, a pair of posts fixed to said platform and projecting therebelow for the remaining two lamps, a fork engaging each post and fixed to the shaft of an associated one of said other two lamps, an electrical conducting means for delivering current to said motor and each of said lamps.

4. The structure of claim 3 in which said electrical conducting means includes a bus plate means, each lamp being equipped with a brush holder in contact with said bus plate means, an electrical connection between each lamp and its associated brush, and a second connection between each lamp and its associated shaft to provide a ground return.

References Cited

UNITED STATES PATENTS 3,309,661    3/1967    Kennelly ----------- 340—50

JOHN W. CALDWELL, *Primary Examiner.*

C. MARMELSTEIN, *Assistant Examiner.*